United States Patent [19]

Rothamel

[11] Patent Number: 4,974,450

[45] Date of Patent: Dec. 4, 1990

[54] APPARATUS FOR MEASURING IMBALANCE OF ROTORS

[75] Inventor: Karl Rothamel, Darmstadt, Fed. Rep. of Germany

[73] Assignee: Hofmann Werkstatt-Technik GmbH, Pfungstadt, Fed. Rep. of Germany

[21] Appl. No.: 241,848

[22] Filed: Sep. 8, 1988

[51] Int. Cl.⁵ .............................................. G01M 1/06
[52] U.S. Cl. ........................................ 73/462; 73/475
[58] Field of Search ................. 73/471, 476, 462, 487, 73/472, 473, 474, 475; 192/1.21, 1.55

[56] References Cited

U.S. PATENT DOCUMENTS

| | | | |
|---|---|---|---|
| 4,223,775 | 9/1980 | Lloyd | 192/1.37 X |
| 4,435,982 | 3/1984 | Borner et al. | 73/462 |
| 4,467,649 | 8/1984 | Mueller | 73/462 |
| 4,489,607 | 12/1984 | Park | 73/462 |
| 4,502,328 | 3/1985 | Wood et al. | 73/462 |
| 4,741,210 | 5/1988 | Maus | 73/462 |

FOREIGN PATENT DOCUMENTS

| | | |
|---|---|---|
| 904204 | 7/1949 | Fed. Rep. of Germany . |
| 2920030 | 5/1979 | Fed. Rep. of Germany . |
| 724952 | 3/1980 | U.S.S.R. . |
| 1495913 | 12/1977 | United Kingdom . |

OTHER PUBLICATIONS

Varaksa, Rotor Dynamic Balancing Drive-has Single Speed Induction Motor Run/Up while two-Speed Induction Motor is Run at Speed Greater Than Sync. Speed Derwent Publications Ltd. Dec. 1980, Atstract, 2 pages.

Primary Examiner—John Chapman
Attorney, Agent, or Firm—Cushman, Darby & Cushman

[57] ABSTRACT

An apparatus for measuring imbalance of rotors, in particular motor vehicle wheels, having a primary shaft driven by an electric motor. The rotor to be tested is secured to the primary shaft with the aid of a clamping device, which transmits the drive torque transmitted to the primary shaft to the rotor by means of friction. The apparatus includes a time-controlled brake, which when the electric motor is switched on reduces the drive torque in a time-controlled manner until the rush moment fades. As a result, loosening of the clamping device is prevented and a gentle start is assured.

12 Claims, 1 Drawing Sheet

APPARATUS FOR MEASURING IMBALANCE OF ROTORS

BACKGROUND OF THE INVENTION

The invention relates to an apparatus for measuring the imbalance of rotors, such as motor vehicle wheels, and more particularly to an apparatus for relieving the potential effects of stress associated with excessively high torque when such measuring apparatus is started.

In conventional imbalance measuring apparatus the rotor to be balanced is secured to a primary shaft by a clamping device having a tensioning nut of the kind in which the drive torque transmitted from an electric motor to the primary shaft is transmitted by means of friction to the rotor to be measured. Such tensioning nuts may lessen when the electric motor is switched on because of high torque applied to the primary shaft at that time. Since clamping devices of this kind are conventionally used for centering the rotor on the primary shaft, the loosening of these rotor clamps is important.

SUMMARY OF THE INVENTION

It is an object of the present invention to provide an apparatus for measuring the imbalance of rotors in which the loosening of the tensioning nut of the clamping device is prevented when the electric driven motor is activated.

This object is attained in accordance with the invention by momentarily limiting or reducing the drive torque initially transmitted to the primary shaft when the electric motor is started by applying a braking force to the primary shaft at that time. This braking force is applied for a limited time or in a time-controlled manner, until such time as a rush moment arising upon actuation, or the high torque at start-up, fades.

It has been found that the opening or loosening of the tensioning nut on the clamping device is caused by an excessively high attracting moment when the electric motor is switched on. This is due to a rush moment or excessively high torque that persists for a plurality of power periods of the supply current and is transmitted to the primary shaft of the balancing machine. In the present invention, the high torque associated with this rush moment or excessively high attracting moment immediately after the electric motor is activated, is suppressed.

The braking moment that reduces the rush moment is time-controlled and can be furnished by a time-controlled brake. This may be a hydraulically actuated brake or an electromagnetic brake. The service brake that serves to stop the rotor rotation after one test run is preferably used to apply this braking force or moment. In that case, no additional components on the balancing machine are needed.

The brake may engage the motor shaft of the electric motor or the primary shaft. Preferably, the brake is switched on or actuated prior to the actuation of the electric motor, and is shut off again after the rush moment fades. Fading of the rush moment on the initially high torques takes approximately 60 msec after electric motor actuation.

As a result, the rotation of the rotor is gently started and permits a jerk-free acceleration of the rotor up to the test rpm. Further, start-up takes place with little vibration or noise.

DESCRIPTION OF THE PREFERRED EMBODIMENTS

Figure 1:
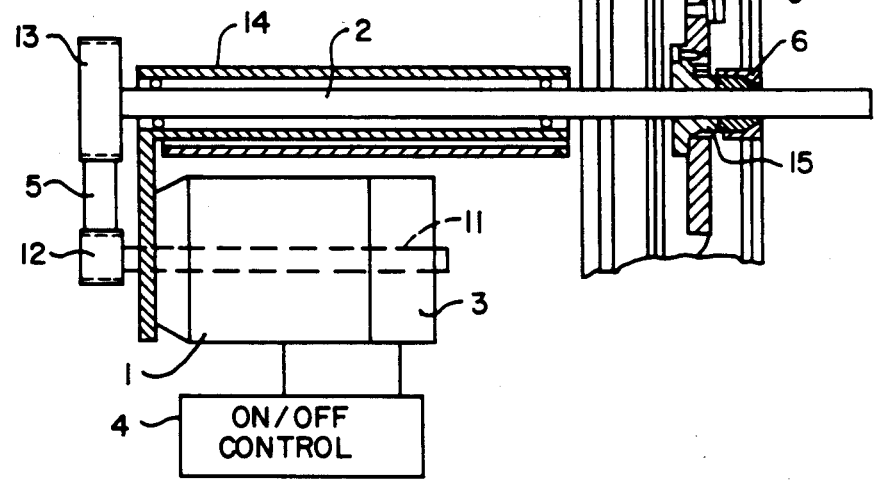
FIG. 1 depicts a side view of a first preferred embodiment of the present invention.

Referring now to the drawings wherein like references represent like parts throughout a rotor to be balanced, which in the preferred embodiments shown is a motor vehicle wheel 10, is secured with the aid of a clamping device, which may be a universal fast-action clamping device including a fastening flange 9, centrally mounted on a primary shaft 2 of a balancing machine, and a centering cone 15 with a tensioning nut 6 mounted on it. A rim 8 of the wheel 10 is screwed to the fastening flange.

The primary shaft 2 of the balancing machine is driven by an electric motor 1. The drive torque of the electric motor 1 is transmitted via a belt drive comprising a pulley 12, mounted on the motor shaft, a driven belt 5, and a pulley 13 mounted on the primary shaft 2. In a first preferred embodiment, as shown in FIG. 1, a brake 3 is connected to the electric motor housing 1 and acts upon or provides a braking force to the motor shaft 11 which is then transmitted to the primary shaft 2. In a second preferred embodiment of FIG. 2, brake 3' acts directly upon the primary shaft 2. Brake 3 and 3' may be a conventional electromagnetic brake that serves to stop the primary shaft after the test run.

An ON and OFF control means 4 is also connected to the motor 1 and the brake 3/3'.

The primary shaft 2 and the electric motor 1, as well as the brake 3, may be supported or secured to a common frame 14. In the second preferred embodiment of FIG. 2, the frame 14 has a suitable extension 14', on which the brake 3' is supported so that it can act directly upon the primary shaft 2.

Figure 2:
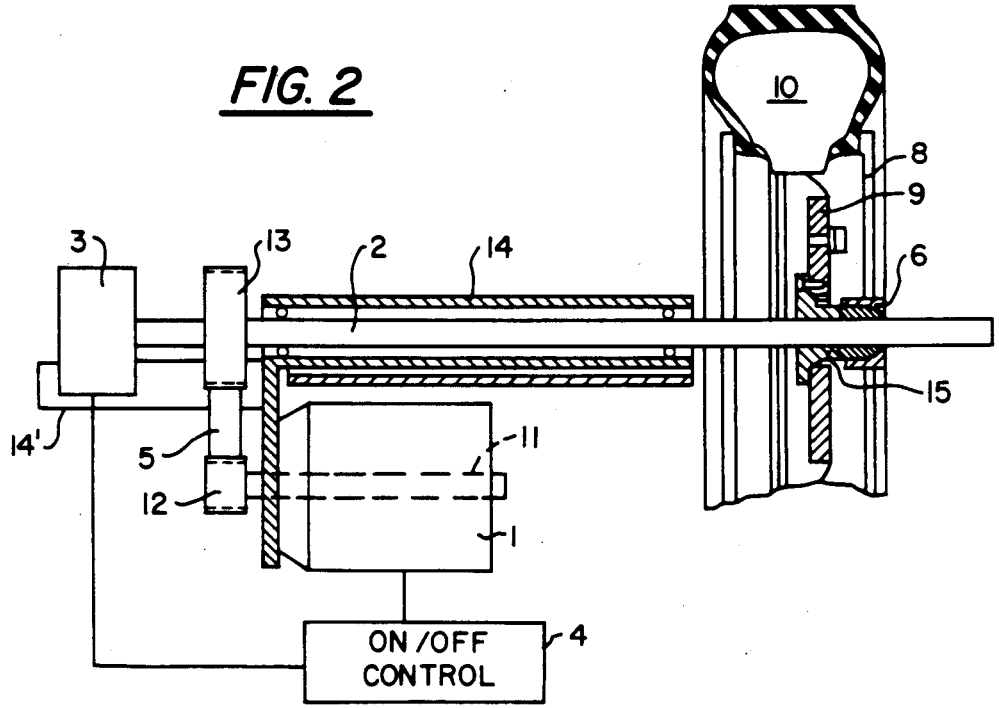
FIG. 2 depicts a side view of a second preferred embodiment of the present invention.

The mode of operation of the apparatus shown in both FIGS. 1 and 2 is as follows:

Before the test run is started, the brake 3/3' is first put into operation with the aid of the ON and OFF control means 4. Then the motor 1 is switched on by the ON and OFF control means 4. Shortly after the electric motor is switched on, but after the rush moment has faded, which occurs approximately 60 msec after the electric motor 1 is switched on, brake 3/3' is switched off. This permits the motor vehicle wheel 10, which is to be balanced, to be started up to the test rpm in a jerk-free, low-vibration and low-noise manner. This starting procedure for shaft 2 and wheel 10 also prevents loosening of the tensioning nut 6 of the clamping primary shaft 2 via the intermediate centering cone 15. The brake 3/3' used at the start-up of shaft 2 is preferably also used as the service brake with which the motor vehicle wheel 10 to be balanced is subsequently stopped after the test run.

What is claimed is:

1. A driving apparatus for rotor imbalance measuring devices comprising:
   a primary shaft disposed on a frame;
   a primary shaft drive means disposed on said frame for providing a driving torque to said primary shaft;
   a clamp associated with said primary shaft to releasably attach a rotor to said primary shaft, means to apply a braking force to said primary shaft and means to control said braking force in relation to the driving torque so as momentarily apply said braking force such that said driving torque is prevented from exceeding predetermined level.

2. An apparatus as in claim 1 wherein said control means terminates said braking force after a predetermined time has elapsed following actuation of said primary shaft drive means.

3. An apparatus as in claim 2 wherein said predetermined time is about 60 m sec.

4. An apparatus as in claim 1 wherein said control means actuates said braking force prior to the actuation of said primary shaft drive means.

5. An apparatus as in claim 4, wherein said primary shaft driving means is an electric motor having a motor shaft and said apparatus further comprises a driving torque transmitting means for transferring the driving torque from said motor shaft to said primary shaft.

6. An apparatus as in claim 5 wherein said brake means includes means for subjecting said motor shaft to a braking moment.

7. An apparatus as in claim 6 wherein said driving torque transmitting means comprises:
   a first pulley operably connected to said motor shaft;
   a second pulley operably connected to said primary shaft; and
   a belt operably connecting said first pulley to said second pulley.

8. An apparatus as in claim 4 wherein said braking means includes means for subjecting said primary shaft to said braking moment.

9. An apparatus for measuring the imbalance of a motor vehicle wheel comprising:
   a primary shaft disposed on a frame;
   an electric motor disposed on said frame and having a motor shaft operably connected to said primary shaft for providing a driving torque to said primary shaft;
   a brake means disposed on said frame for applying a braking moment on the driving torque transmitted from said motor shaft to said primary shaft;
   control means for actuating said brake means prior to the actuation of said electric motor, said control means momentarily applying the braking moment to prevent said driving torque from exceeding a predetermined level; and
   a clamping device associated with the primary shaft to releasably attach a rotor to said primary shaft.

10. An apparatus as in claim 9 wherein said control means includes means to terminate said brake means after a predetermined time.

11. An apparatus as in claim 10 wherein said braking means subjects said motor shaft to a braking moment.

12. An apparatus as in claim 10 wherein said braking means provides a braking moment to said primary shaft.

* * * * *